(12) United States Patent
Esmail

(10) Patent No.: US 10,033,137 B2
(45) Date of Patent: Jul. 24, 2018

(54) ELECTRONIC CABLE MANAGEMENT DEVICE

(71) Applicant: Kemaal Akber Esmail, Mountain View, CA (US)

(72) Inventor: Kemaal Akber Esmail, Mountain View, CA (US)

(73) Assignee: Invaluable Inventions, Mountain View ( * ) Notice: Subject to any disclaimer, the term of this patent is extended or adjusted under 35 U.S.C. 154(b) by 0 days.

(21) Appl. No.: 15/131,001

(22) Filed: Apr. 17, 2016

(65) Prior Publication Data
US 2017/0302022 A1    Oct. 19, 2017

(51) Int. Cl.
*H01R 13/621*    (2006.01)
*H01R 13/506*    (2006.01)
*F16B 37/14*    (2006.01)

(52) U.S. Cl.
CPC ......... *H01R 13/6215* (2013.01); *F16B 37/14* (2013.01); *H01R 13/506* (2013.01)

(58) Field of Classification Search
CPC ... H01R 13/6215; H01R 13/506; F16C 11/06; F16B 37/14
USPC .................................................. 439/310, 304
See application file for complete search history.

(56) References Cited

U.S. PATENT DOCUMENTS

| 5,112,153 A | 5/1992 | Gunn |
|---|---|---|
| 6,948,949 B1 | 9/2005 | Schwartz |
| 2006/0043245 A1 | 3/2006 | Baker |
| 2011/0070764 A1 | 3/2011 | Miya |

FOREIGN PATENT DOCUMENTS

KR    200464096 Y1    12/2012

OTHER PUBLICATIONS

International search report and Written Opinion for PCT equivalent to instant case: PCT/US2017/027761 From KIPO, dated Aug. 2, 2017.

*Primary Examiner* — Briggitte R Hammond
(74) *Attorney, Agent, or Firm* — Mark Penfold

(57) ABSTRACT

Herein are provided a series of embodiments of a cable management device for use with cables with end connector covers. The device provides a tapered surface between the cable and locking screws so as to eliminate right angles which catch during movement of the cord. The device facilitates easy retraction of cables with bulky terminals through constricted spaces, eliminates snagging on other cables, and simplifies cable routing and use. The device further provides a means of rotating the screws while the device is in place. The device can be affixed to existing or newly manufactured cables.

4 Claims, 5 Drawing Sheets

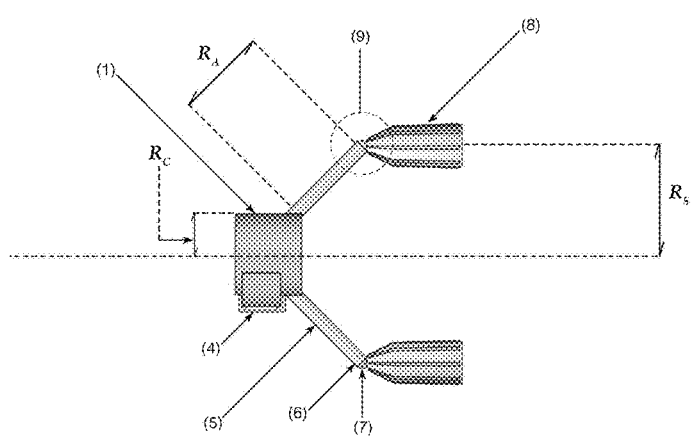 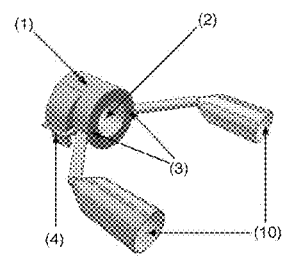
FIG. 1A
FIG. 1B

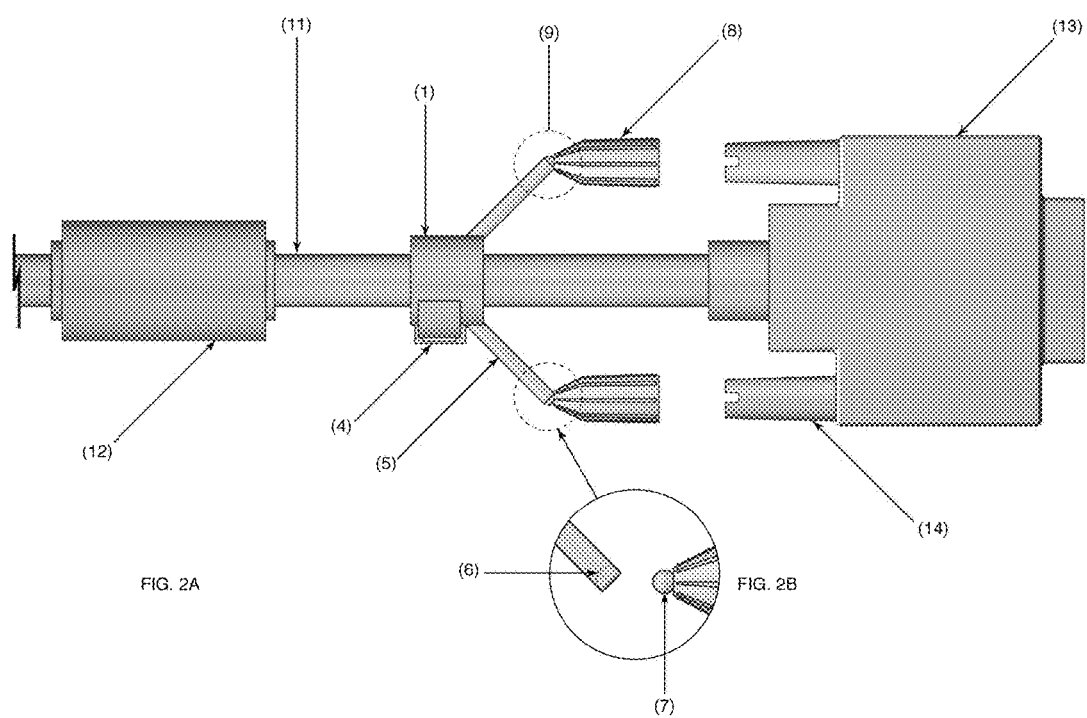

ELECTRONIC CABLE MANAGEMENT DEVICE

BACKGROUND OF THE INVENTION

Cabling plays an integral role in connecting a myriad of systems in today's wired world. Multi-component electrical systems require cabling to connect integrated components in order to function. As these systems may be complex with multiple distant components, the routing of cables through existing and permanent or temporary infrastructure to the desired component can entail passage of cables through restrictions which inhibit easy movement of cables. In addition existing cables provide a major obstacle when installing, moving or rerouting a cable. Existing cables can be snagged and dislodged when a secondary cable is moved, resulting in catastrophic effects to the system as a whole. This invention aims to ameliorate these and other problems.

To compound the afore mentioned problem, many types of cables end with a plug or terminus which facilitates the connection of the cable to a system component. This terminus provides a space where the threads of the cabling are expanded outwards to facilitate the connection and alignment to a component and so becomes thicker than the cable. To protect the terminus, a cable end connector cover is employed, often with projecting locking screws to allow screw rotation and locking into the recipient component. Components with panel mounted connectors usually have threaded nuts that accept locking screws on the cable end connector cover that are used for locking the elements together and offering mechanical strain relief. Typically the cable end connector cover extends outwards at a right angle from the cable, with locking screws inserted parallel to the axis of the cable. For example the D-Subminiature (e.g., D-Sub) connectors contain two or more parallel rows of pins or sockets usually surrounded by a D-shaped metal or other shield that provides mechanical support, ensures correct orientation, and may screen against electromagnetic interference. The inner workings are covered in a plastic or rubber outer sheath which is formed to fit the connection cover and traditionally employs right angles to follow the component shape. This is called the cable end connector cover. Additionally cables often include an encapsulated ferrite bead, also known as a block, core, ring, EMI filter, or choke. These are typically passive electronic components that suppress high frequency noise in electronic circuits, and are fastened to the cable a few inches from the cable end connector cover.

During the process of removing a cable previously connected to a component, while retracting the cable from the component, the locking screws can become snagged on obstacles or other cables and hinder or make impossible the retraction of the cable. The right angle which exists between the cable end connector cover, in addition to the protruding locking screws, results in a cable which is resistant to passage through tight spaces, even though the space provided may be sufficient.

BRIEF SUMMARY OF THE INVENTION

The current invention serves to solve the problem associated with movement and retraction of cords through occluded spaces. The invention provides a device which can be affixed to an existing or a newly manufactured cable, and serves to provide a surface tapered, for example, at 45 degrees between the cable and locking screws so as to facilitate easy retraction of a cable. The device further provides a means of rotating the screws while the device is in place.

The device comprises a collar to attach to a cable, a set of connectors which slide over the locking screws and set of arms joining the two so as to provide a tapering surface between the cable and the locking screws.

A first aspect of the device provides a cylindrical collar with a hollow center to accommodate and encircle a cable. Utilization of a collar to affix the device to a cable allows free movement of the device along the length of the cable, simplifying connection to the locking screws. The collar may be composed of any suitable material which will resist the forces the device and cable may be subjected to in daily use or during retraction. Commonly, the collar will be composed of plastic, metal, rubber, composites or some other suitable material. In one embodiment the collar may be a continuous cylinder, affixed over a new cable during manufacturing and unable to later be removed from the cable. In a further embodiment the collar may be opened and resealed at one or more joints, making the collar removable. Such a collar may be manufactured in one or multiple parts, together comprising a discontinuous cylinder which can be opened in one or more positions to allow insertion of a cable into the collar. Following insertion of the cable, parts are rejoined or closed to provide an intact cylindrical collar. The parts may be separate and designed to be joined by screws, nut and bolts, press closures or other suitable mechanisms. Alternatively, the parts may be joined on one or more sides by a hinge, and designed to be joined at the other side by screws, nut and bolts, press closures or other suitable mechanism. Typically the collar is attached between the cable end connector cover and electronic choke if present and may slide freely along the cable between the two prior to being affixed.

A further aspect of the device provides a pair of arms protruding at an angle from the collar, and to which a set of connectors are attached. The arms, in combination with the connectors, provide a solid surface, transitioning from and angled with respect to the thin cable to the much larger width of the cable end connector cover. This affords a smooth transition between them. This smooth transition inhibits snagging of the cable to infrastructure or other cables, and allows the cable to twist during retraction so as to align to the available passage in restricted spaces, hence facilitating easy movement of the cable in either direction. In one preferred embodiment, the angle of the flexible arms with respect to the collar is 45 degrees. In a further preferred embodiment, the length of the arms may be calculated using the formula $$Ra = \sqrt{(Rs-Rc)^2 + (Rs-Rc)^2}$$

where $R_s$ is the distance from the center of the cable to the center of the locking screw and $R_c$ is the distance from the center of the cable to the outside of the collar, as further detailed in the accompanying drawings.

The end of the arm proximal to the connector terminates with a concave spherical recess capable of forming a ball and socket joint. Typically the arms are manufactured as a part of the collar unit, but may be designed as independent components, and attached to the collar through suitable means. Typically the sockets are manufactured as a part of the arm unit, but may be designed as independent components, and attached to the arm through suitable means. Commonly the arms and sockets will be composed of plastic, metal, rubber, flexible plastic polymers such as nylon or Teflon®, composites or some other suitable material.

A further aspect of the device provides a pair of connectors attached to the arms. These attach between the locking screws of the cable end connector cover and the arms. By covering the locking screws and forming a continuous link to the tapering arms, the connectors serve to ameliorate catching of the screws on obstacles during cable retraction.

The end of the connector proximal to the arm terminates in a spherical ball, capable of forming a ball and socket joint. Joining the ball of the connector and the socket of the arm to form a ball and socket joint permits rotary movement in all directions of the connector with respect to the arm. This facilitates easy attachment to a locking screw.

The opposite end of the connector comprises a cylindrical tube with an internal diameter less than or equal to the external diameter of the locking screws, which can slip tightly over the locking screws so as to cover them, but still facilitate screw rotation due to the ball and socket joint at the other end. In an alternative embodiment the cylindrical tube may be open at one side and have one or more rings or clip mechanisms which respectively fit over or attach to the locking screws. In this way the connectors can be fastened to the locking screws by either lowering over the locking screws, or by pushing from the sides to affix the clipping mechanisms. This is further shown in the accompanying figures.

The connector further comprises a central portion joining its two ends. In one embodiment, the central portion may be composed of a flexible material to facilitate bending of the connector when aligning the cylindrical tube with the locking screws. By allowing flexion in this central region, a single device can accommodate variations in the distance between locking screws. In an alternate embodiment, the central portion may be rigid.

The connectors may be manufactured as a single part with ball, central portion and cylindrical tube all integral to the connector and composed of one or more suitable materials, including those listed above. Alternatively, the connectors may be assembled from two or more pieces designed to fit together. Commonly the connectors will be composed of plastic, metal, rubber, a suitable flexible plastic polymer such as nylon or Teflon®, or some other suitable material.

In an alternative embodiment of the device, the arms and connectors are adjoined and contiguous, without the use of an intervening ball and socket joint. This embodiment contains all aspects of the prior listed embodiments, but excludes the elements of the ball and socket joint and the arm and connector are made out of one piece. This piece may be composed of a flexible material to facilitate bending when aligning the cylindrical tube with the locking screws. By allowing flexion in this central region, a single device can accommodate variations in the distance between locking screws. In an alternate embodiment, the central portion may be rigid.

A further alternative embodiment comprises a cable end connector cover fitted with a set of screws with hinged shafts and further comprising an outer sheath having recesses into which the hinged screws can be folded so as to affect a tapering shape. In further detail, the embodiment comprises a screw, with a hinging mechanism joining a threaded barrel and a screw head. The hinge allows the head of the screws to be angled with respect to the barrel after turning. The embodiment further comprises a modified outer sheath which contains recesses on each side into which the screw heads can fold. The modified outer sheath may formed following the contours of the underlying cable end connector cover, using right angles, or can be formed to have an alternate shape, for instance tapered towards the cable in a triangular or conical fashion. In each instance the outer sheath has recesses to accommodate, either completely or partially, the folded screw heads, so as to affect a tapered shape.

BRIEF DESCRIPTION OF THE SEVERAL VIEWS OF THE DRAWINGS

FIG. 1A shows a first embodiment of the device prior to attachment to a cable, and a cross sectional view thereof as FIG. 1B.

FIG. 2A shows a first embodiment the device after attachment to a cable, but prior to attachment to the cable end connector cover. The figure includes an expanded view of a ball and socket joint as FIG. 2B.

FIG. 4A shows views of an alternative embodiment the device, in which the arms and connectors are adjoined, while

DETAILED DESCRIPTION OF THE INVENTION

Figure 3:
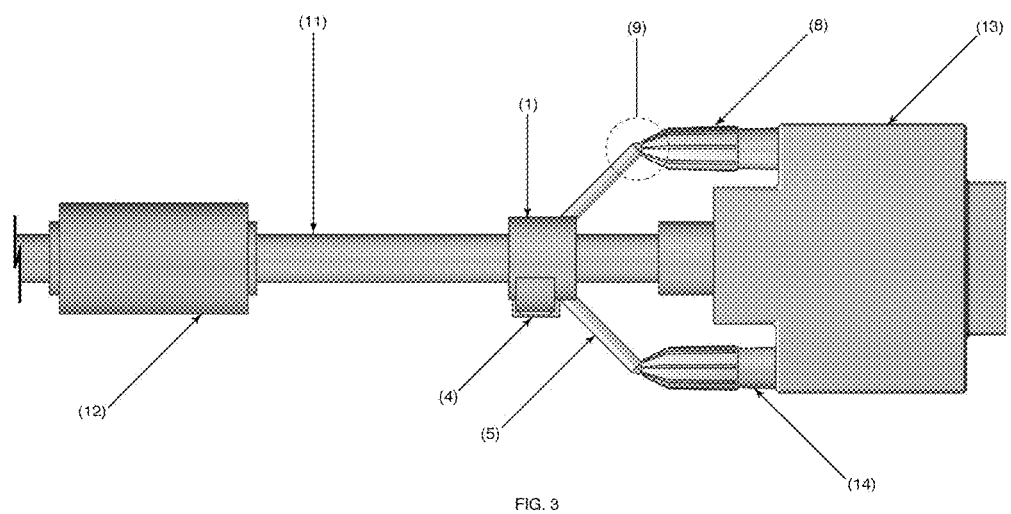
FIG. 3 shows a first embodiment the device attached to a cable, and installed on to the cable end connector cover locking screws.

FIG. 1A illustrates a detailed view of one embodiment of the device, and includes a cross sectional view as FIG. 1B. The figures show a cylindrical collar (1) with a hollow center (2). In this embodiment the collar has an opening (3) in which a cable can be inserted, and a closing mechanism (4) to close the opening so as to permanently or temporarily affix the collar to a cable. Attached to opposite sides of the collar is a pair of arms (5) extending, for instance, at an angle of 45 degrees from the collar. In a further embodiment, the angle of the arms may be calculated using the formula provided in the Summary of the Invention. Variables $R_A$, $R_C$ and $R_S$ are shown. Each arm terminates in a socket (6), which combines with a ball (7) on one end of the connector (8) to form a ball and socket joint (9). The ball in this illustration is integral to the connector, the other end of which is hollowed at its termination (10) so as to allow fitment over the locking screws.

FIG. 2 illustrates a view of one embodiment of the device when attached to a cable, but not yet fitted to the locking screws, and includes an expanded view of a ball and socket joint as FIG. 2B. The figures show a cable (11) with an attached electronic choke (12) to which an embodiment of the device has been attached. The device embodiment is as shown in FIG. 1 and includes a cylindrical collar (1), a closing mechanism (4), a pair of arms (5), a socket (6), a ball (7) and a connector (8). FIG. 2B shows an expanded view of the ball and socket joint in which the arm and connector separated for viewing simplicity. The cable terminates with a cable end connector cover (13) with locking screws (14).

FIG. 3 illustrates a view of one embodiment of the device attached to a cable and moved into the fitted position on the locking screws. The figure shows a cable (11) and electronic choke (12), an embodiment of the device as shown in FIG. 1 and including a cylindrical collar (1), a closing mechanism (4), a pair of arms (5), a ball and socket joint (9) and a connector (8). The cable terminates with a cable end connector cover (13), and locking screws (14). In this view the connectors (8) have been inserted over the locking screws (14) to affix the device to the cable cover.

Figure 4A:
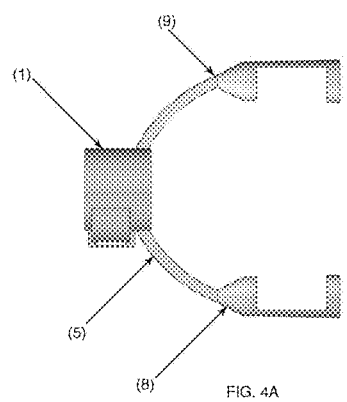
Figure 4B:
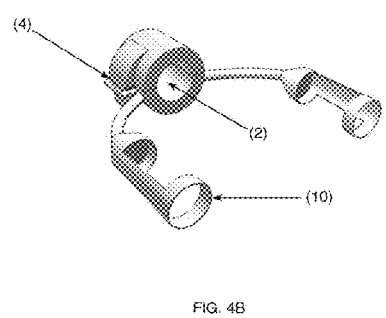
FIG. 4B shows an expanded view of a ball and socket joint.
Figures 4C, 4D, 4E, 4F:
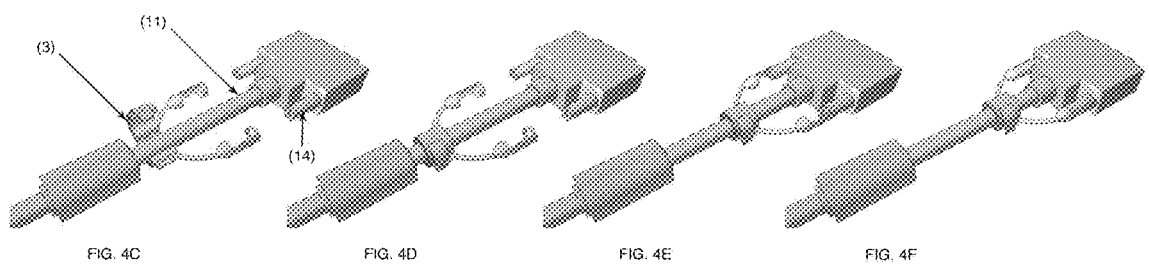
FIGS. 4C through 4F shows alternative views of the device as it is fitted into place on a cable.

FIG. 4 illustrates a variety of views of an alternative embodiment of the device, in which the arms and connectors are adjoined and contiguous, without the use of an intervening ball and socket joint. FIG. 4A shows a side view of the device, while FIG. 4B illustrates a cross sectional view. As with the prior embodiments the device has a cylindrical collar (1) with a hollow center (2). In this embodiment the collar has an opening (3) in which a cable can be inserted, and a closing mechanism (4) to close the opening so as to permanently or temporarily affix the collar to a cable. Attached to opposite sides of the collar is a pair of arms (5) extending, for instance, at an angle of 45 degrees from the collar. In a further embodiment, the angle of the arms may be calculated using the formula provided in the Summary of the Invention. In the illustrated embodiment the arms (5) are attached to and contiguous with the connectors (8), the combined piece now being angled (9) at the position of the excluded ball joint. The connectors (10) diagramed in this embodiment are open and accommodate the locking screws (14) via a ring at each end. FIGS. 4C thru 4F show a suggested use of the device. In detail, the device is aligned with the cable (11) (FIG. 4C), attached to the cable (FIG. 4D), moved into alignment with the locking screws (14) (FIG. 4E) and finally fitted into position (FIG. 4F).

Figure 5A:
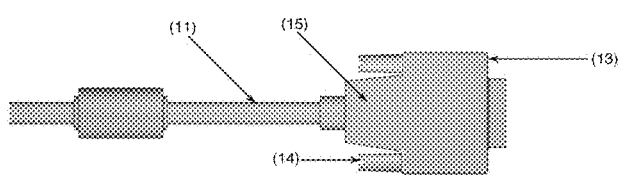
FIG. 5 shows views of a further alternative embodiment the device comprising a cable end connection cover with hinged screws and a modified outer sheath. The hinged screws are shown being retracted into the sheath in FIGS. 5A through 5C.
Figure 5B:
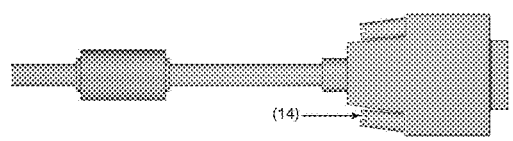
Figure 5C:
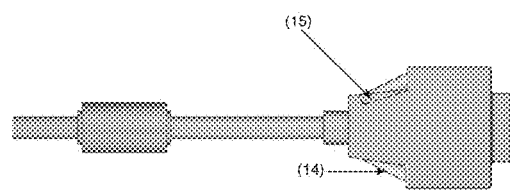

FIG. 5 illustrates three views of a further alternative embodiment the device comprising a modified cable end connection cover with hinged screws and a modified outer sheath having recesses. In FIG. 5A the device is seen with the screws in the open or linear position, ready to be screwed into the receptacle nuts of the system component. The cable (11) terminates in the embodiment of the device, a cable end connection cover (13) with hinged locking screws (14) and modified outer sheath (15). In FIG. 5B the hinged screws (14) are shown partially folded, while FIG. 5C shows the screws (14) folded and firmly fitted into the recesses (15) of the modified outer sheath.

DESCRIPTION OF EMBODIMENTS

It is understood that the embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed:

1. A device comprising:
   a cylindrical collar with a hollow center capable of accommodating a cable, and
   a pair of arms attached to and extending at an angle of 45 degrees from said collar and terminating in a socket, and
   a pair of connectors each comprising:
      a ball at one end, fitting to said socket to form an operable ball and socket joint between said arm and connector, and
      a cylindrical tube at an other end, having an internal diameter less than or equal to an external diameter of the locking screws of a cable end connector cover, such that said tube affixes to and facilitates turning of the screws.

2. The device of claim 1, wherein the cylindrical collar has a mechanism for opening and closing around the cable to facilitate attachment and removal.

3. The device of claim 1, wherein the length of the arm is calculated using the formula $Ra=\sqrt{(Rs-Rc)^2+(Rs-Rc)^2}$.

4. The device of claim 2, wherein the length of the arm is calculated using the formula $Ra=\sqrt{(Rs-Rc)^2+(Rs-Rc)^2}$.

* * * * *